US012803194B2

(12) United States Patent
Inoue et al.

(10) Patent No.: US 12,803,194 B2
(45) Date of Patent: Nov. 17, 2026

(54) ELECTRIC-WIRE-EQUIPPED CONNECTION MEMBER AND ELECTRIC WIRE CONNECTION STRUCTURE

(71) Applicant: SUMITOMO ELECTRIC INDUSTRIES, LTD., Osaka (JP)

(72) Inventors: Takeshi Inoue, Osaka (JP); Mitsuaki Tamura, Osaka (JP); Tetsuya Nakanishi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 344 days.

(21) Appl. No.: 18/520,733

(22) Filed: Nov. 28, 2023

(65) Prior Publication Data

US 2024/0178590 A1 May 30, 2024

(30) Foreign Application Priority Data

Nov. 30, 2022 (JP) ................................ 2022-191603

(51) Int. Cl.
*H01R 12/59* (2011.01)
*G02B 6/42* (2006.01)
*H01R 13/6587* (2011.01)

(52) U.S. Cl.
CPC ........... *H01R 12/598* (2013.01); *G02B 6/428* (2013.01); *H01R 13/6587* (2013.01)

(58) Field of Classification Search
CPC ...... H01R 12/598; H01R 12/59; H01R 12/61; H01R 12/77; H01R 12/78; H01R 13/6587; G02B 6/928
USPC ................................ 439/329, 493, 581, 577
See application file for complete search history.

(56) References Cited

U.S. PATENT DOCUMENTS 3,910,665 A * 10/1975 Stull ...................... H01R 24/50 439/63
5,344,338 A * 9/1994 Colleran ................ H01R 12/79 439/465
5,462,451 A * 10/1995 Yeh ...................... H01R 12/774 439/493
6,540,548 B1 * 4/2003 Zhang .................... H01R 43/28 439/98

(Continued)

FOREIGN PATENT DOCUMENTS

JP H08-236180 A 9/1996
JP 2000-277941 A 10/2000

(Continued)

*Primary Examiner* — Gary F Paumen
(74) *Attorney, Agent, or Firm* — Renner, Otto, Boisselle & Sklar LLP

(57) ABSTRACT

An electric-wire-equipped connection member includes: an electric wire including a center conductor, an insulating layer covering the center conductor, and a shield layer made of metal and covering the insulating layer; and an insulating substrate including a first surface and a second surface and having a through hole which has openings in the first surface and the second surface and in which a portion of the electric wire where the shield layer is exposed is inserted. The center conductor is exposed from the first surface of the insulating substrate. The insulating substrate includes a metal plating layer formed continuously on an inner peripheral surface of the through hole and at least one of the first surface and the second surface. The shield layer is electrically connected to the metal plating layer.

10 Claims, 5 Drawing Sheets

(56) References Cited

U.S. PATENT DOCUMENTS

| | | | | |
|---|---|---|---|---|
| 6,857,898 | B2 * | 2/2005 | Engquist ................ | H01R 12/79<br>439/493 |
| 7,510,425 | B2 * | 3/2009 | Kuo ....................... | H01R 12/79<br>439/942 |
| 8,123,556 | B2 * | 2/2012 | Esplin .................. | H01R 9/0515<br>439/63 |
| 2004/0092117 | A1 | 5/2004 | Suemasu et al. | |
| 2004/0180539 | A1 | 9/2004 | Yamamoto et al. | |
| 2005/0020115 | A1 * | 1/2005 | Edwardsen ............ | H05K 3/325<br>439/329 |
| 2009/0258538 | A1 * | 10/2009 | Yaghmai ............ | G01R 31/2889<br>439/581 |
| 2011/0183544 | A1 * | 7/2011 | Esplin .................. | H01R 9/0515<br>439/581 |
| 2020/0357734 | A1 | 11/2020 | Koga et al. | |
| 2022/0329032 | A1 * | 10/2022 | Little ..................... | H01R 12/75 |

FOREIGN PATENT DOCUMENTS

| | | | |
|---|---|---|---|
| JP | 2003-178826 | A | 6/2003 |
| JP | 2004-259838 | A | 9/2004 |
| JP | 2005-005539 | A | 1/2005 |
| JP | 2010-009994 | A | 1/2010 |

* cited by examiner

ELECTRIC-WIRE-EQUIPPED CONNECTION MEMBER AND ELECTRIC WIRE CONNECTION STRUCTURE

TECHNICAL FIELD

The present disclosure relates to an electric-wire-equipped connection member and an electric wire connection structure. This application is based on and claims priority under 35 USC 119 from Japanese Patent Application No. 2022-191603 filed on Nov. 30, 2022, the contents of which are incorporated herein by reference.

BACKGROUND

In an end connecting portion disclosed in JP2003-178826A, in order to connect a plurality of conducting wires to a circuit board on which a circuit pattern is formed, end portions of the conducting wires are stripped off, and the conducting wires are soldered to the circuit board.

SUMMARY

The present disclosure provides an electric-wire-equipped connection member including: an electric wire including a center conductor, an insulating layer covering the center conductor, and a shield layer made of metal and covering the insulating layer; and an insulating substrate including a first surface and a second surface and having a through hole which has openings in the first surface and the second surface and in which a portion of the electric wire where the shield layer is exposed is inserted, in which: the center conductor is exposed from the first surface of the insulating substrate; the insulating substrate includes a metal plating layer formed continuously on an inner peripheral surface of the through hole and at least one of the first surface and the second surface; and the shield layer is electrically connected to the metal plating layer.

The present disclosure provides an electric wire connection structure including: the above-described electric-wire-equipped connection member; and an electric circuit board, wherein the electric circuit board includes a signal circuit pattern and a ground circuit pattern, and wherein the center conductor is connected to the signal circuit pattern, and the metal plating layer is connected to the ground circuit pattern.

DETAILED DESCRIPTION

Figure 1:
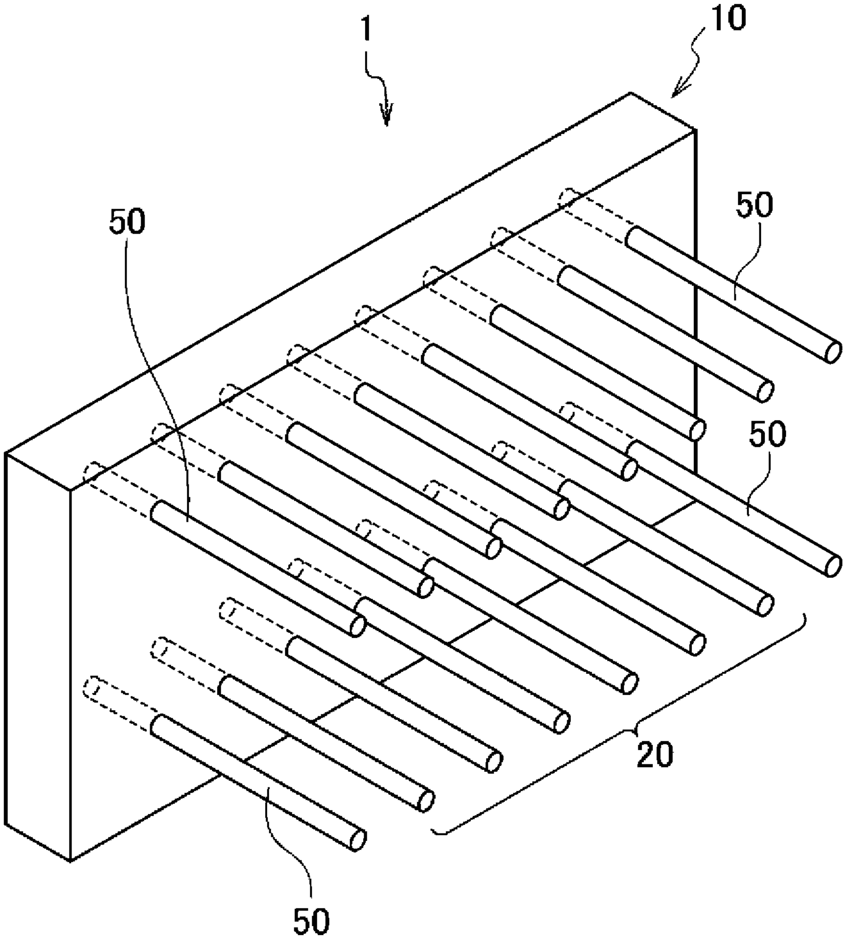
FIG. 1 is a schematic perspective view showing an example of an electric-wire-equipped connection member according to the present disclosure.

In recent years, with the miniaturization of electronic components, further reduction in cable diameter is desired.

However, it is difficult to solder a conducting wire with reduced diameter. Particularly, for a coaxial wire, soldering is more difficult since it is necessary to further strip layers of an electric wire with reduced diameter in a stepped manner and perform soldering for each of a conducting wire for transmitting a signal and a shield layer covering the conducting wire. In addition, at the time of soldering, heat may be transferred to an insulator or a shield covering the outside of the conducting wire, and the insulator or an outermost jacket may melt.

An object of the present disclosure is to provide an electric-wire-equipped connection member and an electric wire connection structure that can stably connect an electric wire to a circuit board or the like.

According to the present disclosure, the electric wire can be stably connected to the circuit board or the like.

DESCRIPTION OF EMBODIMENTS OF PRESENT DISCLOSURE

First, an embodiment of the present disclosure will be listed and described.

(1) In one aspect of the present disclosure, an electric-wire-equipped connection member includes: an electric wire including a center conductor, an insulating layer covering the center conductor, and a shield layer made of metal and covering the insulating layer; and an insulating substrate including a first surface and a second surface and having a through hole which has openings in the first surface and the second surface and in which a portion of the electric wire where the shield layer is exposed is inserted, in which: the center conductor is exposed from the first surface of the insulating substrate; the insulating substrate includes a metal plating layer formed continuously on an inner peripheral surface of the through hole and at least one of the first surface and the second surface; and the shield layer is electrically connected to the metal plating layer.

According to this configuration, the surface of the insulating substrate on which the metal plating layer is provided can be soldered to a connection target such as an electric circuit board, so that heat is hardly transferred to an electric wire inserted into the through hole. Accordingly, the electric wire can be stably connected to the connection target.

(2) In the electric-wire-equipped connection member according to (1), the shield layer may be fixed to the insulating substrate in the through hole.

According to this configuration, the conducting wire is fixed so as to be electrically connected to the insulating substrate in the through hole of the insulating substrate. Accordingly, the conducting wire can be connected to the insulating substrate so that a potential of the shield layer and a potential of the insulating substrate are the same.

(3) In one aspect of the present disclosure, an electric wire connection structure includes: the electric-wire-equipped connection member according to according to (1) or (2); and an electric circuit board, in which: the electric circuit board includes a signal circuit pattern and a ground circuit pattern, and the center conductor is connected to the signal circuit pattern; and the metal plating layer is connected to the ground circuit pattern.

According to this configuration, the electric-wire-equipped connection member according to (1) or (2) is used, so that even if the connection target of the electric wire is the electric circuit board, the electric wire can be stably connected to the electric circuit board.

(4) In the electric wire connection structure according to (3), the center conductor and the metal plating layer may be connected to the electric circuit board by an anisotropic conductive sheet.

According to this configuration, the center conductor and the electric circuit board, and the metal plating layer and the electric circuit board are butted against each other with the anisotropic conductive sheet sandwich therebetween and are connected to the electric circuit board, so that the connection between the center conductor and the signal circuit pattern and the connection between the metal plating layer and the ground circuit pattern can be more stably performed.

(5) In the electric wire connection structure according to (3) or (4), the insulating substrate may include a metal plating layer on an outer surface entirely, and may be connected to the electric circuit board by a solder portion.

According to this configuration, the outer surface of the insulating substrate is entirely plated with metal, so that the insulating substrate can be connected to the electric circuit board by soldering. Accordingly, as compared with a case where a thin center conductor is directly soldered to an electric circuit board, the insulating substrate and the electric circuit board can be stably connected to each other by a simpler method, so that the conducting wire can be stably connected to the electric circuit board.

(6) In the electric-wire-equipped connection member according to any one of the above (1) or (2) or the electric wire connection structure according to any one of (3) to (5), the insulating substrate may have an optical connection through hole that is different from the through hole, and the optical connection through hole may be configured to allow an optical fiber to be inserted therein.

According to this configuration, the configuration of the present disclosure can also be used as a photoelectric composite connection member for transmitting an electrical signal and an optical signal by both the electric wire and the optical fiber.

DETAILS OF EMBODIMENTS OF PRESENT DISCLOSURE

Specific examples of an electric-wire-equipped connection member and an electric wire connection structure according to an embodiment of the present disclosure will be described below with reference to the drawings. The present disclosure is not limited to these exemplifications, but is indicated by the scope of claims, and is intended to include all modifications within a scope and meaning equivalent to the scope of claims.

FIG. 1 is a view showing an example of an electric-wire-equipped connection member 1 according to the present disclosure. The electric-wire-equipped connection member 1 according to the present embodiment can be used, for example, to connect an electric wire to a circuit board.

As shown in FIG. 1, the electric-wire-equipped connection member 1 according to the present embodiment includes an insulating substrate 10, coaxial wires 20, and optical fibers 50. The insulating substrate 10 may be, for example, a glass substrate made of glass. In the present embodiment, the coaxial wires 20 are used as electric wires used in the electric-wire-equipped connection member 1, and the present disclosure is not limited to this. For example, the electric wire may be a cable having a plurality of conductors or a shielded flat cable having a plurality of conductors.

Figure 2A:
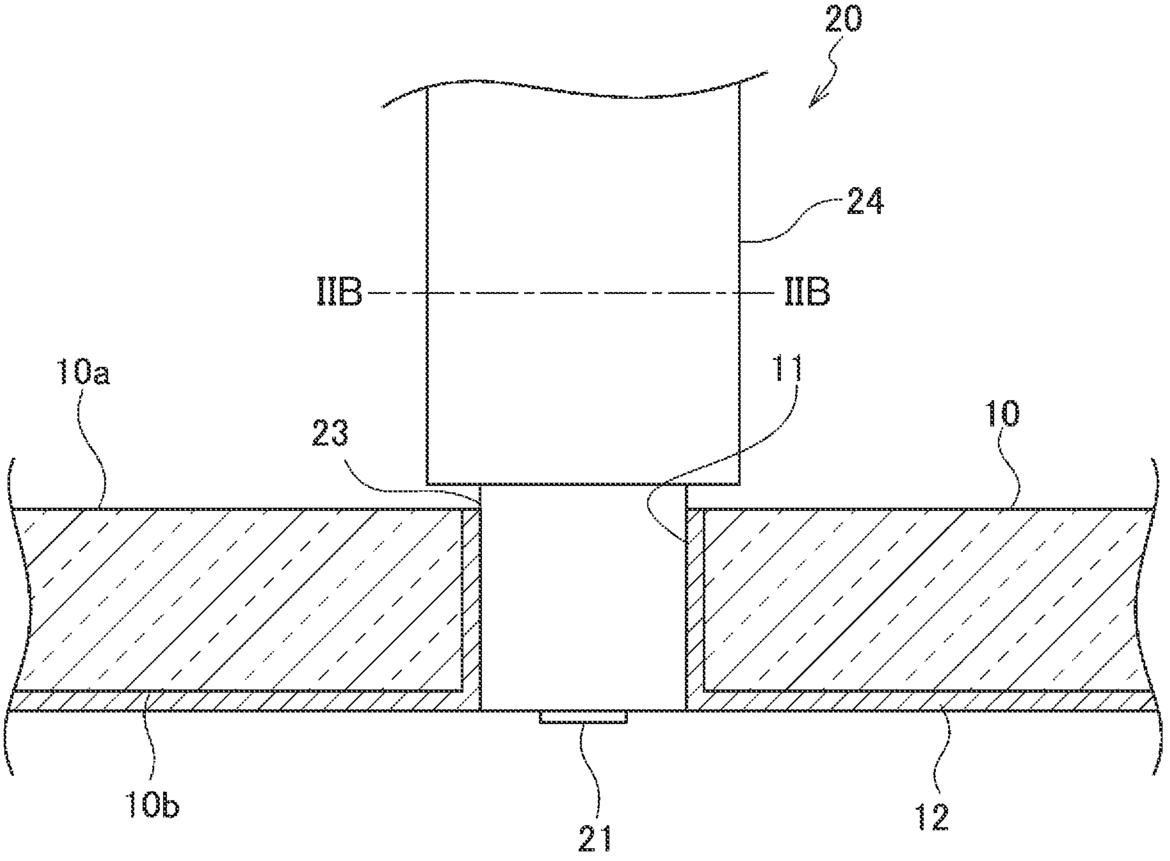
FIG. 2A is a cross-sectional view of the electric-wire-equipped connection member shown in FIG. 1.

The insulating substrate 10 has a plurality of through holes 11 (see FIG. 2A). The plurality of through holes 11 of the present embodiment are arranged in two rows and eight columns in the insulating substrate 10. The through hole 11 is configured such that the coaxial wire 20 for transmitting an electrical signal and the optical fiber 50 for transmitting an optical signal can be inserted therein.

In the example shown in FIG. 1, the optical fibers 50 are inserted into a first row-first column, a first row-eighth column, a second row-first column, and a second row-eighth column of the through holes 11, and the coaxial wires 20 are inserted into other through holes 11. The number, arrangement, and shape of the through holes 11 provided in the insulating substrate 10 are not limited to the example shown in FIG. 1.

Figure 2B:
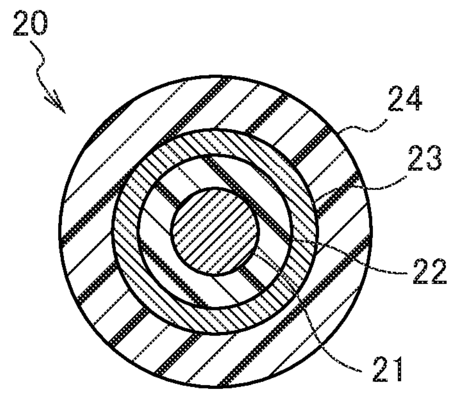
FIG. 2B is a cross-sectional view of a coaxial wire cut along the line IIB-IIB shown in FIG. 2A.

Next, a form in which the coaxial wire 20 is inserted into the through hole 11 of the insulating substrate 10 in the present embodiment will be described in detail with reference to FIGS. 2A and 2B. FIG. 2A is a cross-sectional view of the electric-wire-equipped connection member 1 shown in FIG. 1, and FIG. 2B is a cross-sectional view of the coaxial wire 20 cut along the line IIB-IIB shown in FIG. 2A. As shown in FIG. 2A, a continuous metal plating layer 12 is provided on an inner peripheral surface of the through hole 11 and at least one surface of surfaces on which the through hole is open. In the present embodiment, of the surfaces of the insulating substrate 10 on which the through hole is open, a surface on which the metal plating layer 12 is not provided is a front surface 10*a*, and a surface on which the metal plating layer 12 is provided is a back surface 10*b*.

In the present embodiment, the optical fiber 50 inserted into the through hole 11 of the insulating substrate 10 may have, for example, a core, a clad covering the core, and a coating layer. For example, the optical fiber 50 may be stripped of the coating layer at a tip end, inserted into the through hole 11 and fixed inside the through bole 11 with an adhesive.

In the present embodiment, as shown in FIG. 2B, the coaxial wire 20 inserted into the through hole 11 of the insulating substrate 10 includes a center conductor 21, an insulating layer 22 covering the center conductor 21, a metal shield layer 23 covering the insulating layer 22, and a jacket 24 covering the shield layer 23. The center conductor 21 is a single wire or a stranded wire in which a plurality of thin wires are twisted together and made of a conductive metal such as a copper alloy. The insulating layer 22 is formed of an insulating resin and electrically insulates the center conductor 21 from the periphery while the center conductor 21 is protected. The shield layer 23 is formed by metal braid or metal plating, and prevents leakage of a signal flowing through the center conductor 21 and prevents external radio waves from entering the center conductor 21. The jacket 24 is formed of an insulating resin, and prevents the shield layer 23 from being damaged while the shield layer 23 is electrically insulated from the outside.

The coaxial wire 20 that can be used in the present disclosure is not limited to the above-described embodiment. For example, a metal plating shielded electric wire in which the shield layer 23 is made of metal plating and does not have the jacket 24 may be used.

The coaxial wire 20 is inserted into the through hole 11 with the shield layer 23 exposed. That is, the coaxial wire 20 is inserted into the through hole 11 with the jacket 24 at a tip end portion to be inserted into the through hole 11 cleaved off. The center conductor 21 is exposed to the outside at the tip end of the inserted coaxial wire 20. At this time, the center conductor 21 may protrude from the back surface 10*b* in a cross-sectional view, or the tip end of the center conductor 21 and the back surface 10*b* may be on the same plane.

In a state where the coaxial wire 20 is inserted into the through hole 11, the coaxial wire 20 is fixed so that the shield layer 23 can be electrically connected to the metal plating layer 12. In the present embodiment, the coaxial wire 20 and the through hole 11 are fixed by bonding an outer peripheral surface of the shield layer 23 and the inner peripheral surface of the through hole 11 using a conductive adhesive. Note that fixation of the coaxial wire 20 and the through hole 11 is not limited to the above-described form. For example, the shield layer 23 of the coaxial wire 20 and the metal plating layer 12 may be connected to each other by a conductive adhesive at an opening of the through hole 11. A diameter of the through hole 11 may be set such that the shield layer 23 and the inner peripheral surface of the through hole 11 are constantly in contact with each other, and the coaxial wire 20 may be press-fitted into the through hole 11.

In any of the above-described fixing forms, the shield layer 23 is fixed conductively to the metal plating layer 12. This allows a potential of the shield layer 23 and a potential of the metal plating layer 12 of the insulating substrate 10 to be the same.

Figure 3:
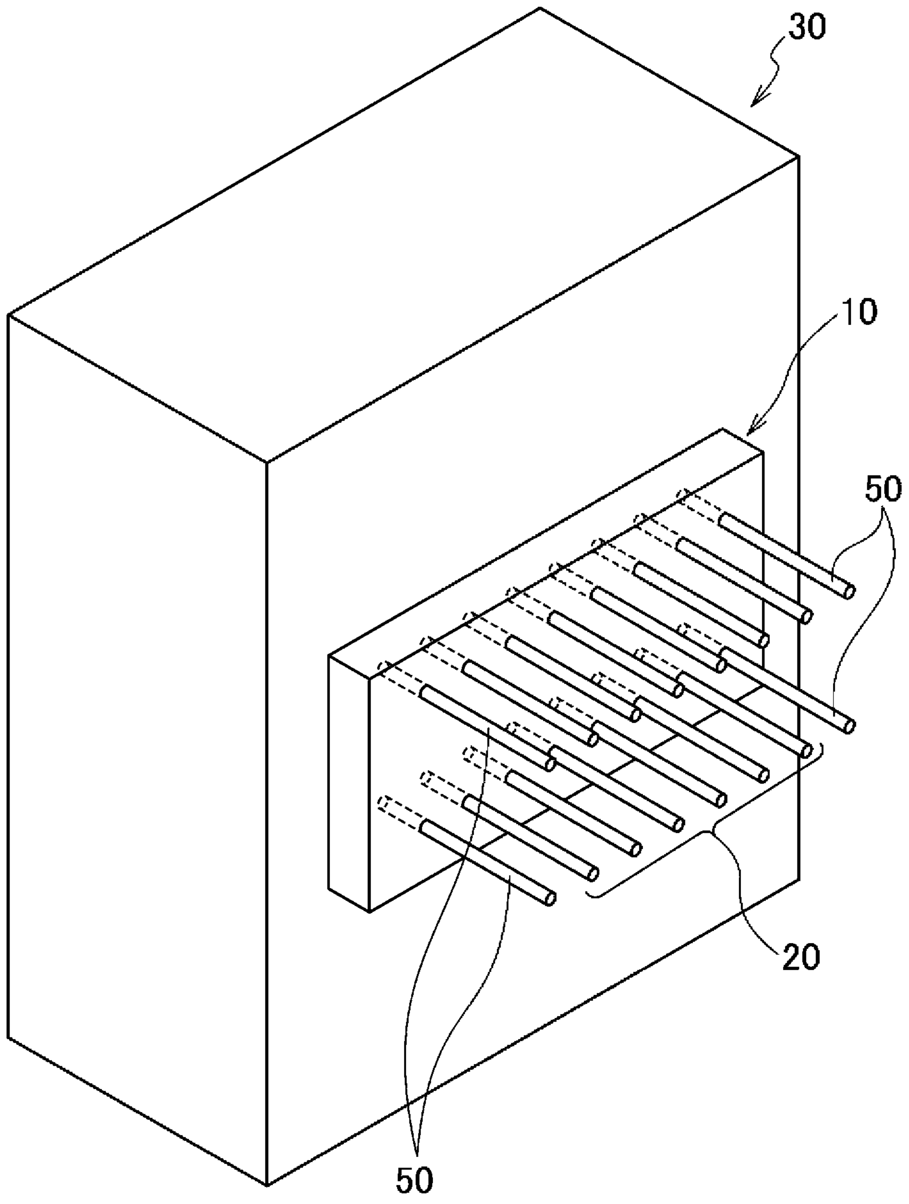
FIG. 3 is a schematic perspective view showing an example of an electric wire connection structure according to the present disclosure.

Next, an electric wire connection structure using the above-described electric-wire-equipped connection member 1 will be described in detail with reference to FIG. 3. FIG. 3 is a view showing an example of the electric wire connection structure according to the present disclosure. In the present embodiment, the above-described electric-wire-equipped connection member 1 is connected to an electric circuit board 30. The electric circuit board 30 is a resin circuit board with a circuit pattern printed a front surface thereof.

Although not shown in the electric circuit board 30 shown in FIG. 3, of each surface of the electric circuit board 30, a ground circuit pattern 31 (see FIG. 4) connectable to the insulating substrate 10 and a signal circuit pattern 32 (see FIG. 4) connectable to the center conductor 21 are printed on a surface 30*a* to be connected to the electric-wire-equipped connection member 1. Further, the surface 30*a* is provided with an optical waveguide such as another optical fiber connectable to the optical fiber 50, a light receiving element, a light emitting element, and the like.

Figure 4:
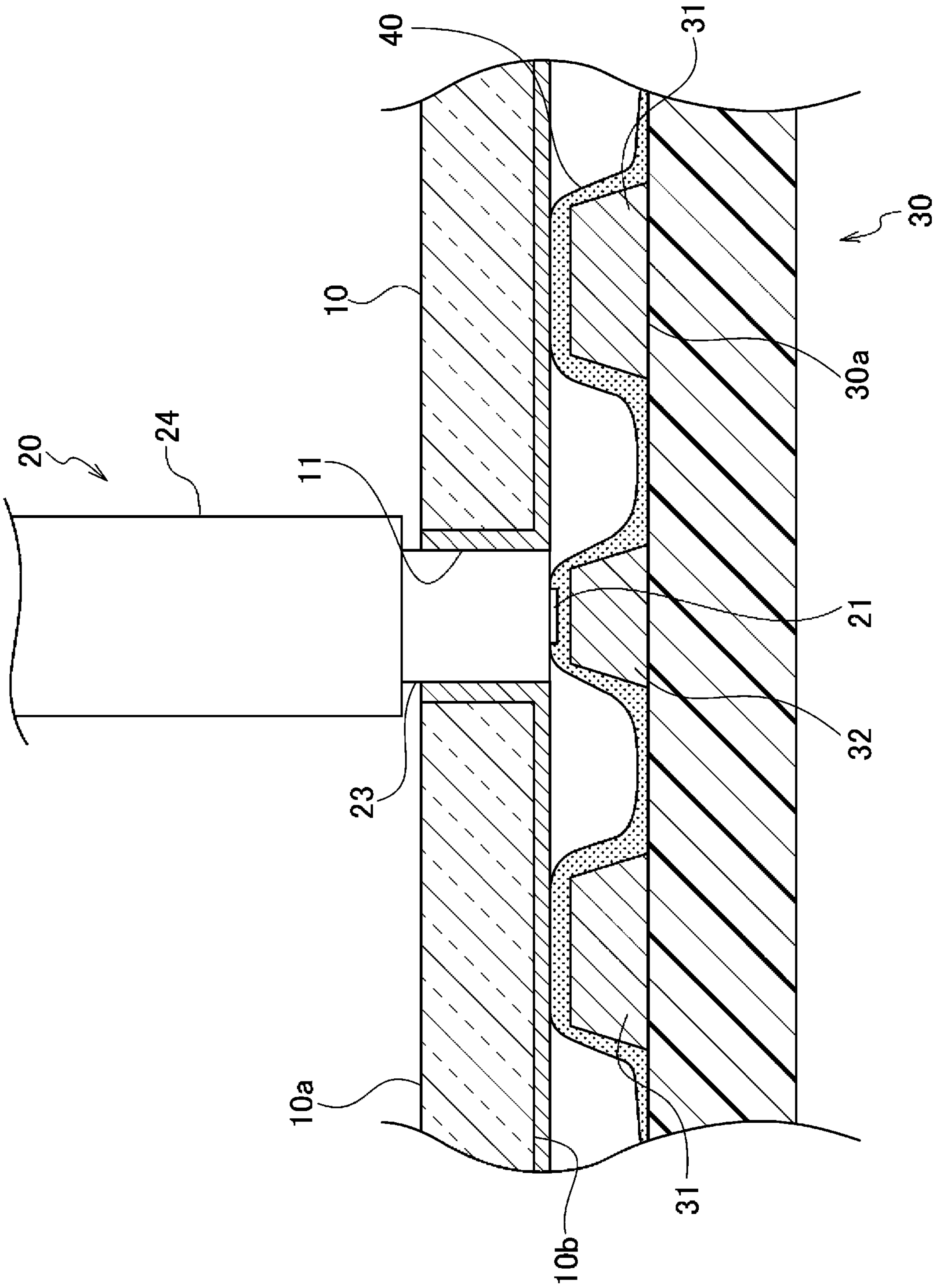
FIG. 4 is a cross-sectional view showing a connection form of the electric wire connection structure shown in FIG. 3.

Next, a connection structure between the electric-wire-equipped connection member 1 and the electric circuit board 30 will be described in detail with reference to FIG. 4. FIG. 4 is a cross-sectional view showing a connection form of the electric wire connection structure shown in FIG. 3. As shown in FIG. 4, the surface 30*a* of the electric circuit board 30 is disposed to face the back surface 10*b* of the electric-wire-equipped connection member 1, and the back surface 10*b* and the surface 30*a* are connected to each other such that predetermined relative positions are in contact with each other. As a result, the metal plating layer 12 provided on the back surface 10*b* of the insulating substrate 10 and the ground circuit pattern 31 on the electric circuit board 30 are connected, and the center conductor 21 of the coaxial wire 20 and the signal circuit pattern 32 on the electric circuit board 30 are electrically connected.

In the present embodiment, the connection between the electric-wire-equipped connection member 1 and the electric circuit board 30 is performed by an anisotropic conductive sheet 40. The anisotropic conductive sheet 40 is formed by mixing fine metal particles into a thermoplastic resin. When the electric-wire-equipped connection member 1 is connected to the electric circuit board 30, the anisotropic conductive sheet 40 is disposed therebetween, and the electric-wire-equipped connection member 1 and the electric circuit board 30 are crimped and heated to soften the thermoplastic resin. After the crimping and heating, the resin is cooled and solidified, so that the electric-wire-equipped connection member 1 and the electric circuit board 30 are bonded to each other by the thermoplastic resin. After the bonding, the anisotropic conductive sheet 40 is electrically conducted only in a thickness direction, and is not electrically conducted in a surface direction. That is, the electrical conduction between the metal plating layer 12 and the ground circuit pattern 31 and the electrical conduction between the center conductor 21 and the signal circuit pattern 32 are secured by the fine metal particles in the anisotropic conductive sheet 40. The ground circuit pattern 31 and the signal circuit pattern 32 are insulated.

The electric-wire-equipped connection member 1 and the electric circuit board 30 may be connected by soldering or the like.

When the optical fiber 50 in the electric-wire-equipped connection member 1 is connected to the electric circuit board 30, the optical fiber 50 inserted into the through hole 11 can be connected to another optical fiber or the like on the electric circuit board 30. That is, the electric-wire-equipped connection member 1 can be used as a photoelectric composite connection member for transmitting an electrical signal and an optical signal by both the coaxial wire 20 and the optical fiber 50.

In the related art, when a coaxial wire and an electric circuit board are connected to each other by soldering, a center conductor of the coaxial wire and a signal circuit pattern are connected by soldering, and a shield layer of the coaxial wire and a ground circuit pattern are connected by soldering. However, in the soldering of the shield layer and the ground circuit pattern, an insulating layer covered by the shield layer may melt due to the heat generated during the soldering, which makes connection difficult.

According to the electric wire connection structure of the present disclosure, the metal plating layer 12 provided on the insulating substrate 10 is directly connected to the ground circuit pattern 31, and the shield layer 23 is electrically connected to the ground circuit pattern 31 via the metal plating layer 12. Therefore, in n the connection between the electric-wire-equipped connection member 1 and the electric circuit board 30, heat generated at the time of connection is not easily transmitted to the shield layer 23, so that the shield layer 23 is not easily affected by the heat. Therefore, the coaxial wire can be stably connected to the circuit board.

Further, in the related art, when the coaxial wire and the electric circuit board are connected to each other by soldering, it is necessary to cleave off a jacket covering the shield layer in order to connect the shield layer to the electric circuit board, and to cleave off the insulating layer covering the center conductor and the shield layer in order to connect the center conductor to the electric circuit board. Therefore, in addition to complicating a connection process, it is necessary to expose the insulating layer and the center conductor from the shield layer in a plurality of coaxial wires, which may cause impedance mismatch at exposed portions.

According to the electric wire connection structure of the present disclosure, it is not necessary to cleave off the shield layer 23 covering the center conductor 21 and the insulating layer 22 at the time of connection, so that a process for connection can be simplified. In addition, a length of the shield layer 23 and a length of the center conductor 21 can be made substantially the same for a plurality of coaxial wires, so that it is easy to match impedances on an input side and an output side. Accordingly, it is possible to provide an electric wire connection structure suitable for high-speed transmission.

Figure 5:
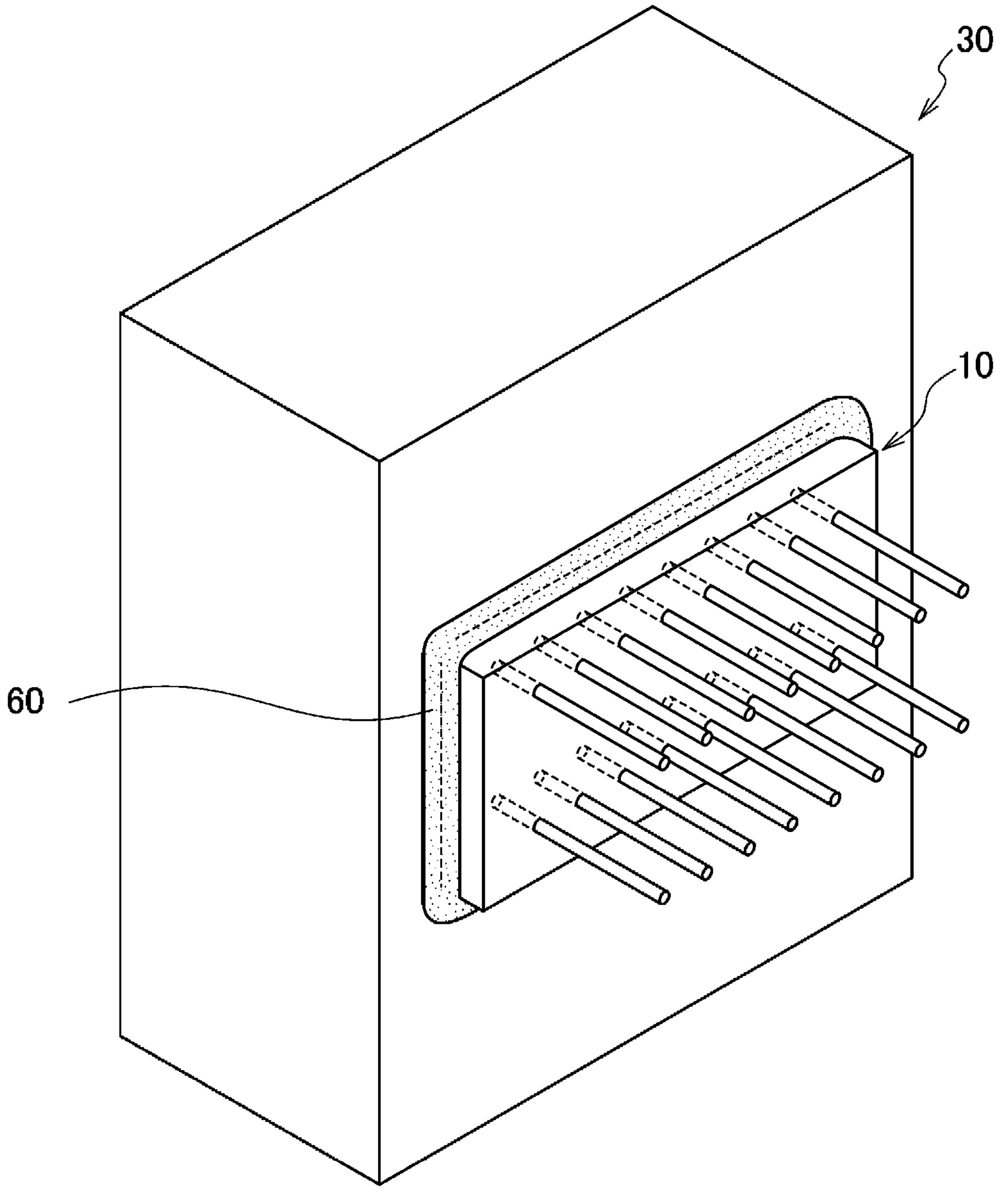
FIG. 5 is a schematic perspective view showing another example of the electric wire connection structure according to the present disclosure.

In the embodiment described above, an example is described in which the electric-wire-equipped connection member 1 and the electric circuit board 30 are connected by the anisotropic conductive sheet 40, but the electric wire connection structure according to the present disclosure is not limited to this. FIG. 5 shows another form of connection between the electric-wire-equipped connection member 1 and the electric circuit board 30. FIG. 5 is a view showing another example of the electric wire connection structure according to the present disclosure.

In the example shown in FIG. 5, the metal plating layer 12 is provided on the entire surface of the insulating substrate 10, and connection between the metal plating layer 12 of the electric-wire-equipped connection member 1 and the ground circuit pattern 31 of the electric circuit board 30 is made by (solder portion 60) soldering the insulating substrate 10 and the electric circuit board 30. At this time, connection between the center conductor 21 and the signal circuit pattern 32 is performed by pressing the center conductor 21 and the signal circuit pattern 32 against each other. The connection between the center conductor 21 and the signal circuit pattern 32 may be performed by an anisotropic conductive sheet, soldering, or the like.

According to the embodiment described above, the connection between the electric-wire-equipped connection member 1 and the electric circuit board 30 is performed by soldering the insulating substrate 10 and the electric circuit board 30, and the electrical connection between the metal plating layer 12 and the ground circuit pattern 31 is performed by pressing them against each other, so that an amount of heat transferred to the shield layer 23 is further reduced. Therefore, the coaxial wire can be stably connected to the circuit board.

Although the embodiment of the present disclosure has been described above, the technical scope of the present disclosure should not be construed as being limited by the description of the embodiment. The present embodiment is merely an example, and it will be obvious to those skilled in the art that various embodiments can be changed within the scope of the appended claims. The technical scope of the present disclosure should be defined based on the scope recited in the claims and the scope of equivalents thereof.

What is claimed is:

1. An electric wire connection structure comprising:
an electric-wire-equipped connection member and
an electric circuit board,
wherein the electric-wire-equipped connection member includes:
an electric wire comprising a center conductor, an insulating layer covering the center conductor, and a shield layer made of metal and covering the insulating layer; and
an insulating substrate comprising a first surface and a second surface and having a through hole which has openings in the first surface and the second surface and in which a portion of the electric wire where the shield layer is exposed is inserted,
wherein the center conductor is exposed from the first surface of the insulating substrate,
wherein the insulating substrate comprises a metal plating layer formed continuously on an inner peripheral surface of the through hole and at least one of the first surface and the second surface, and
wherein the shield layer is electrically connected to the metal plating layer:
and
wherein the electric circuit board comprises a signal circuit pattern and a ground circuit pattern, and
wherein the center conductor is connected to the signal circuit pattern, and the metal plating layer is connected to the ground circuit pattern,
wherein the center conductor and the metal plating layer are connected to the electric circuit board by an anisotropic conductive sheet.

2. The electric-wire-equipped connection member according to claim 1, wherein the shield layer is fixed to the insulating substrate in the through hole.

3. The electric wire connection structure according to claim 1, wherein the insulating substrate comprises a metal plating layer on an outer surface of the insulating substrate entirely, and is connected to the electric circuit board by a solder portion.

4. The electric-wire-equipped connection member according to claim 1,
wherein the insulating substrate has an optical connection through hole that is different from the through hole, and
wherein the optical connection through hole is configured to allow an optical fiber to be inserted therein.

5. The electric wire connection structure according to claim 1,
wherein the anisotropic conductive sheet comprises fine metal particles dispersed in a thermoplastic resin.

6. The electric wire connection structure according to claim 5,
wherein the thermoplastic resin bonds the electric-wire-equipped connection member and the electric circuit board to each other.

7. The electric wire connection structure according to claim 1,
wherein the anisotropic conductive sheet is configured to electrically conduct only in a thickness direction of the anisotropic conductive sheet and not electrically conduct in a surface direction of the anisotropic conductive sheet.

8. The electric wire connection structure according to claim 7,
wherein electrical conduction between the metal plating layer and the ground circuit pattern and electrical conduction between the center conductor and the signal circuit pattern are secured by fine metal particles in the anisotropic conductive sheet.

9. The electric wire connection structure according to claim 8,
wherein the ground circuit pattern and the signal circuit pattern are insulated from each other.

10. The electric wire connection structure according to claim 1,
wherein the anisotropic conductive sheet is disposed between the electric-wire-equipped connection member and the electric circuit board.

* * * * *